UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLUE DYE.

SPECIFICATION forming part of Letters Patent No. 434,493, dated August 19, 1890.

Application filed April 17, 1890. Serial No. 348,393. (Specimens.)

*To all whom it may concern:*

Be it known that I, ARTHUR WEINBERG, doctor of philosophy, a citizen of the Empire of Germany, and a resident of Frankfort-on-the-Main, Germany, have invented certain new and useful Improvements in the Manufacture of Blue Dye-Stuffs, of which the following is a specification.

The object of this process is the manufacture of coloring-matters of the series of the Chionines, which are to be employed for dyeing animal fiber in an acid bath. The bodies of this group known at the present time (violet lauth, methylene-blue) are not fit for this purpose.

I. *Symmetrical Disulphothionines.*

*a.* As point of departure, I use the methyl and ethyl benzyl-paraphenylene-diamine-sulphonic acids, the manufacture of which I describe as follows: By mixing a strongly-acid solution of ethyl-benzyl-aniline-sulphonic acid with nitrite of soda at a temperature not exceeding 20° Centigrade the nitrous acid is absorbed and a yellow crystalline precipitate separates, which is the nitroso-ethyl-benzyl-aniline-sulphonic acid. This nitroso-sulphonic acid is difficultly soluble in pure water. It is easily soluble in alkalies or strong acids, with which it forms salts of an intensely-yellow color. In reducing the acid solution with zinc-dust the ethyl-benzyl-paraphenylene-diamine-sulphonic acid is obtained. By addition of acetate of soda this latter separates from the neutralized solution in colorless crystals. It is easily soluble in mineral acids and in alkalies. For the manufacture of the dye-stuff it is not necessary to isolate the acid. It is sufficient to determine the quantity contained in the solution by titration with a solution of nitrate of soda. In the same manner the methylic derivative is obtained.

*b.* By oxidizing the solution of methyl or ethyl-benzyl-paraphenylene-diamine-sulphonic acid in the presence of sulphureted hydrogen at first a sulphonic acid of an Indamine containing sulphur is formed, which, when heated together with chloride of zinc, is transformed into dimethyl or diethyl-dibenzylthionine-disulphonic acid. These acids are very easily soluble in water; more difficultly so in alcohol. Their salts are easily soluble. They dye wool a greenish blue of the shade of indigo carmine. Example: The solution of twelve kilos of ethyl-benzyl-paraphenylene-diamine-sulphonic acid, obtained, as described under I, is mixed with thirty kilos muriatic acid and filled up with water to four hundred liters, hereupon five kilos sulphide of sodium and six kilos bichromate of potassium in concentrated solution are added gradually and at short intervals. A tarry precipitate separates. Then I add fifty kilos of a solution of chloride of zinc 55° Baumé and boil for a short time. The solution of the color is filtered and precipitated with salt. It precipitates in bronzed and tarry flakes.

*c.* The introduction of sulphur can be performed not only by sulphureted hydrogen, but also by the aid of thio-sulphuric acid. After this process an intermediate product—the sulpho-benzyl methyl or ethyl-phenylene-diamine-thiosulphonic acid—is formed. In the presence of oxidizing means the thio-sulphonic acid combines with methyl or ethyl-benzyl-aniline-sulphonic acid and forms the disulpho-indamine-thiosulphonate, which gives a dark-green solution. The solution of this body when heated is partly transformed into thionic sulphonic acid, which is identical to that obtained after *b.* This transformation is effected with special facility in the presence of chloride of zinc. The above-described reactions can be made all at one time, or, better, successively. For instance, I dissolve thirty kilos of benzyl-ethyl-paraphenylene-diamine-sulphonic acid in three hundred liters water. I neutralize if there is any free mineral acid. Mix with a solution of twenty-six kilos thiosulphate of soda, to which shortly before, at a medium temperature, a solution of thirty kilos of aluminium-sulphate had been added, and then oxidize with ten kilos bichromate of potash. The solution, which at first is a deep red, soon becomes colorless. Hereupon I add a diluted solution of twenty-nine kilos benzyl-etheyl-aniline-sulphonic acid and oxidize with thirty kilos of bichromate of potash, boil for a short time, and add during this operation some chloride of zinc. The dye-stuff, which has now been formed, appears as a dark blueish solution. I filter the solution and precipitate by means of salt. The thus-obtained coloring-matter may be designated by the following formula:

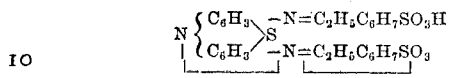

II. *Unsymmetrical Disulphothionines.*

*a.* By oxidizing the methylene-sulpho-benzyl - paraphenylene - diamine - thiosulphonic acid in the manner described under *c* I, with the ethyl-benzyl-aniline-sulphonic acid, (or in the reversed way,) the methyl-ethyl-dibenzyl-thioninedisulphonic acid is obtained, which perfectly resembles the diethyle product.

*b.* By replacing in example No. 1 the benzyl-ethyl-aniline-sulphonic acid by twenty-six kilos mono-benzyl-aniline-sulphonic acid monomethyl or ethyl - dibenzyl-thionine - disulphonic acid, is obtained. This coloring-matter is similar to the dimethylic derivatives, producing, however, less pure shades.

*c.* The dibenzyl-aniline-disulphonic acid is treated in the way described under I *a.* The dibenzyl-paraphenylene-diamine-disulphonic acid is obtained, which is very easily soluble. It shows reactions analogous to those of the acids already described. Oxidized together with thiosulphuric acid it is transformed into a thiosulphonic acid. By oxidizing this together with one equivalent of dimethyl or diethyl aniline methyl or ethyl aniline, ortholuidine and heating, unsymmetrical disulphoacids of thionines are obtained—for instance, a solution of fifty-six kilos of disulphodibenzyl - paraphenylene - diamine - thiosulphonic acid is mixed with a solution of fifteen and one-half kilos chlorhydrate of dimethyl aniline. To this mixture thirty kilos bichromate of potash are added. The green solution is heated and during the operation ten kilos chloride of zinc are added. The coloring-matter dissolves. The solution is of a deep-blue shade. It is then filtered and precipitated with salt. The thus-obtained product may be designated by the following formula:

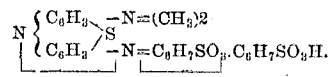

What I claim as new, and desire to secure by Letters Patent, is—

The new blue coloring - matter above described, having the chemical constitution of a disulphonated tertiary dibenzyl derivative of thionine, showing the following characteristics: it is easily soluble in water with a bright-blue color, less soluble in spirit, insoluble in ether, it dissolves in strong sulphuric acid with a green color, which is changed into blue by addition of water; by reducing agents it is transformed into the leucosulfo acid. It dyes the animal fiber in an acid bath a greenish blue.

In testimony that I claim the foregoing as my invention I have signed my name, in presence of two witnesses, this 3d day of April, 1890.

ARTHUR WEINBERG.

Witnesses:
 FRANK H. MASON,
 ALVESTO P. HOGUE.